*US011810188B1*

United States Patent
Bergida et al.

(10) Patent No.: US 11,810,188 B1
(45) Date of Patent: Nov. 7, 2023

(54) ELECTRONIC IDENTIFICATION AND REPORTING OF ERRORS IN CREDIT REPORTS

(71) Applicant: Credit Versio LLC, Las Vegas, NV (US)

(72) Inventors: David Bergida, Las Vegas, NV (US); Ari Gross, Las Vegas, NV (US)

(73) Assignee: Credit Versio LLC, Las Vegas, NV (US)

( * ) Notice: Subject to any disclaimer, the term of this patent is extended or adjusted under 35 U.S.C. 154(b) by 183 days.

(21) Appl. No.: 17/390,323

(22) Filed: Jul. 30, 2021

Related U.S. Application Data

(60) Provisional application No. 63/059,922, filed on Jul. 31, 2020.

(51) Int. Cl.
| | |
|---|---|
| *G06Q 40/00* | (2023.01) |
| *G06F 16/215* | (2019.01) |
| *G06F 16/23* | (2019.01) |
| *G06F 40/40* | (2020.01) |
| *G06Q 40/03* | (2023.01) |
| *G06Q 40/12* | (2023.01) |

(52) U.S. Cl.
CPC ........... *G06Q 40/03* (2023.01); *G06F 16/215* (2019.01); *G06F 16/2365* (2019.01); *G06F 40/40* (2020.01); *G06Q 40/12* (2013.12)

(58) Field of Classification Search
CPC ...... G06Q 40/03; G06Q 40/12; G06F 16/215; G06F 16/2365; G06F 40/40
See application file for complete search history.

(56) References Cited

U.S. PATENT DOCUMENTS

| | | |
|---|---|---|
| 7,818,228 B1 * | 10/2010 | Coulter ................ G06Q 40/02 705/35 |
| 8,930,263 B1 | 1/2015 | Mahacek et al. |
| 10,366,450 B1 | 7/2019 | Mahacek et al. |
| 10,482,532 B1 | 11/2019 | Kapezynski |
| 10,621,657 B2 | 4/2020 | Kasower |
| 10,685,398 B1 | 6/2020 | Olson et al. |
| 10,963,959 B2 | 3/2021 | Wasser et al. |
| 2007/0112668 A1 | 5/2007 | Celano et al. |
| 2019/0043125 A1 | 2/2019 | Cropper |

* cited by examiner

*Primary Examiner* — Paul Danneman
(74) *Attorney, Agent, or Firm* — Fleit Intellectual Property Law; Paul D. Bianco; Jon Gibbons

(57) ABSTRACT

A computer system accesses electronically stored data pertaining to a consumer's current and historical credit reports from a plurality of credit bureaus. Errors in the reports are identified by the computer system, which can then create dispute letters detailing the errors with text customized for each error. The computer processes the data to identify errors within a single report and between multiple reports, both current and historical. The errors can relate to multiple accounts on a given report duplicating the same debt with the same or differing status, and reports from different credit bureaus reporting the same debt with differing status. The status can include the debt being open or closed, and the date a status of the debt changed. The errors are presented on a display with which particular errors can be selected to be included in the report.

13 Claims, 6 Drawing Sheets

EQUIFAX CREDIT REPORT

622  5/1/2020

ACCOUNTS

HYUNDAI  #4242424242424242***
Account Type: Auto  Owner: Individual
Date Opened: 05/06/2019  Status: Open
Past Due: $437  Balance: $437

CHASE  #4343434343434343***
Account Type: Credit Card  Limit: $5,000
Date Opened: 05/06/2019  Status: Closed, Charged Off
Past Due: $500  Balance: $500

{ The same account is being reported closed on one bureau's report and open on another. One of them must be incorrect and therefore an error is identified. }

TRANSUNION CREDIT REPORT

625  5/1/2020

ACCOUNTS

HYUNDAI  #4242424242424242***
Account Type: Auto  Owner: Individual
Date Opened: 05/06/2019  Status: Closed
Past Due: $0  Balance: $0

CHASE  #4343434343434343***
Account Type: Credit Card  Limit: $5,000
Date Opened: 05/06/2019  Status: Closed, Charged Off
Past Due: $500  Balance: $500

FIG. 4

TRANSUNION CREDIT REPORT 5/1/2020

622

ACCOUNTS

COLLECTION AGENCY NV. #42424242424242****
Account Type: Collection   Open Date: 4/1/2020
Balance: $50   Status: Open CHASE #43434343434343****
Account Type: Credit Card   Limit: $500
Date Opened: 05/06/2019   Status: Closed Charged Off
Past Due: $200   Balance: $200

{ The same account is being reported on both Transunion reports, however the open date has changed from one report to another - therefore an error is identified. }

TRANSUNION CREDIT REPORT 2/1/2020

625

ACCOUNTS

COLLECTION AGENCY NV. #42424242424242****
Account Type: Collection   Open Date: 10/1/2015
Balance: $50   Status: Open CHASE #43434343434343****
Account Type: Credit Card   Limit: $500
Date Opened: 05/06/2019   Status: Closed Charged Off
Past Due: $200   Balance: $200

FIG. 5

ELECTRONIC IDENTIFICATION AND REPORTING OF ERRORS IN CREDIT REPORTS

TECHNICAL FIELD

The present disclosure generally relates to credit reports and credit scores and more specifically to a method and system of automatic audit, detection, and dispute generation for errors in credit reports and/or credit scores.

BACKGROUND

The widespread availability of financial credit has led to the ubiquitous nature of credit reports. Some individuals are obsessed with their credit score, which is a numerical value assessing the prospective borrower's credit risk based on debt payment history. Such a credit score may be used by a creditor to determine if credit should be extended to a prospective borrower, and if so, the amount and terms (e.g. interest rate).

Credit reports are provided by credit bureaus or credit reporting agencies. A borrower's credit report typically includes records of prior credit transactions by the borrower, amounts borrowed, and debt payment history, which can be used to calculate the credit score. If a borrower's poor credit score is a result of incorrect negative credit report information, the borrower may be able to improve the credit score by correcting disputed items in the credit report. The dispute process may be a lengthy and tedious process in some scenarios requiring various types of documentation. To repair their credit, a borrower may be required to individually compose a letter to each credit report agency to dispute incorrect information.

Although there are professional and legal services that assist individuals in repairing credit and/or increasing a credit score, these services can be costly and may not result in an appreciable change for reasons unrelated to the individual. As a result, a number of software applications and internet-based systems are available for an individual to utilize for "do-it-yourself" credit repair.

U.S. Patent Application Publication No. 2019/0043125 A1 of Cropper relates to a credit report dispute automation apparatus and associated methods. U.S. Patent Application Publication No. 2007/0112668 A1 of Celano and Wheelock relates to a method and apparatus for a consumer interactive credit report analysis and score reconciliation adaptive education and counseling system. Each of these references, like commercially available systems, requires considerable input from the user. As a result, particularly for users not familiar with financial transactions, the benefits are questionable at best since there is real potential for errors in trying to correct the errors in a credit report.

Thus, there exists a need for an improved method and system of automatic audit, detection, and dispute generation for errors in credit reports and/or credit scores.

SUMMARY OF THE DISCLOSURE

In an embodiment of the disclosure, a method for electronically detecting errors in a first credit report of an individual from a first credit agency and a second credit report of the individual from a second credit agency, comprises electronically receiving, using a computer system with a hardware computer processor, credit reports produced by the first and second credit agency; using the hardware computer processor to: identify a first category of errors in the first credit report by finding contradictions contained within each account in the first credit report; identify a first category of errors in the second credit report by finding contradictions contained within each account in the second credit report; identify a second category of errors in the first credit report by finding contradictions or duplications by comparing at least two accounts in the first credit report; identify a second category of errors in the second credit report by finding contradictions or duplications by comparing at least two accounts in the second credit report; identify a third category of errors by finding discrepancies in at least one account found in both the first and second credit reports; electronically store previous versions of the first credit report and the second credit report, the previous versions electronically readable by the hardware computer processor; identify a fourth category of errors in the first credit report by finding discrepancies between the first credit report and at least one previous credit report for the individual from the first agency; and identify a fourth category of errors in the second credit report by finding discrepancies between the second credit report and at least one previous credit report for the individual from the second agency, wherein each of the identifying steps is performable by the processor without human intervention; in response to identifying at least one category of errors, present the errors to a human user together with an electronic display interface for selecting errors to include or omit; an generating a report of the included errors in a reporting format accepted by at least one of the first and second credit agency.

In variations thereof, the method includes electronically storing previous versions of the first credit report and the second credit report include uploading the first and second credit reports to an online account associated with the individual; the generated report is electronically transmittable to the at least one of the first and second credit agency; and/or the computer processor is used to electronically transmit reports to at least one of the first and second credit agency.

In another embodiment of the disclosure, a method for automatic audit, detection, and dispute generation for errors in credit reports and/or credit scores comprises: electronically storing data pertaining to a consumer's past and current credit reports from a plurality of credit bureaus; accessing the stored data over a computer network using one or more computer processors executing instructions stored on non-transitory media; processing the stored data using the one or more computer processors to identify errors (a) within a given report affecting a single account, (b) within a given report affecting multiple accounts, (c) between current reports from different credit bureaus, and (d) between current and past reports from a given credit bureau, and (e) between current and past reports from different credit bureaus; presenting a user interface controllable by the one or more processor, the interface including the identified errors, each selectable by a user of the interface to be included or not included in a report disputing the errors; and electronically preparing the report using the one or more processors, the report including the selected errors, a report prepared for each credit bureau having one or more of the errors in the report, in a format acceptable by the credit bureau.

In a variation thereof, the at least one processor can identify errors corresponding to, at least: (a) a plurality of accounts on a given report duplicating the same debt with the same status, (b) a plurality of accounts on a given report reporting the same debt with a different status, and (c) reports from different credit bureaus reporting the same debt with differing status; wherein status can include: (i) the debt being open, (ii) the debt being closed, and (iii) the date a status of the debt changed.

In further variations thereof, electronically preparing the report includes the at least one processor selecting textual language to include in the report corresponding to each of the particular errors identified; the at least one processor electronically communicates the electronically prepared report to one or more credit bureaus; the electronically stored data is stored in an electronic account associated with the consumer; and/or the computer processor enables at least one of electronic transmission of the report and printing of the report for sending to each of the bureaus.

In a further embodiment of the disclosure, a computer system for automatic audit, detection, and dispute generation for errors in credit reports and/or credit scores comprises one or more computer processors executing instructions stored on non-transitory media, the instructions operative to: electronically store data pertaining to a consumer's past and current credit reports from a plurality of credit bureaus; access the stored data over a computer network; process the stored data to identify errors (a) within a given report affecting a single account, (b) within a given report affecting multiple accounts, (c) between current reports from different credit bureaus, and (d) between current and past reports from a given credit bureau, and (e) between current and past reports from different credit bureaus; present a user interface controllable by the one or more processor, the interface including the identified errors, each selectable by a user of the interface to be included or not included in a report disputing the errors; and electronically prepare the report using the one or more processors, the report including the selected errors, a report prepared for each credit bureau having one or more of the errors in the report, in a format acceptable by the credit bureau.

In variations thereof, the instructions are further operative to electronically transmit the report; and/or the instructions are further operative to electronically transmit reports to at least one of the credit bureaus.

BRIEF DESCRIPTION OF THE DRAWINGS

A more complete understanding of the present disclosure, and the attendant advantages and features thereof, will be more readily understood by reference to the following description when considered in conjunction with the accompanying drawings wherein:

FIG. 4 shows an example of a Category 3 Error.
FIG. 5 shows an example of a Category 4 Error.

DETAILED DESCRIPTION OF THE DISCLOSURE

Figure 1A:
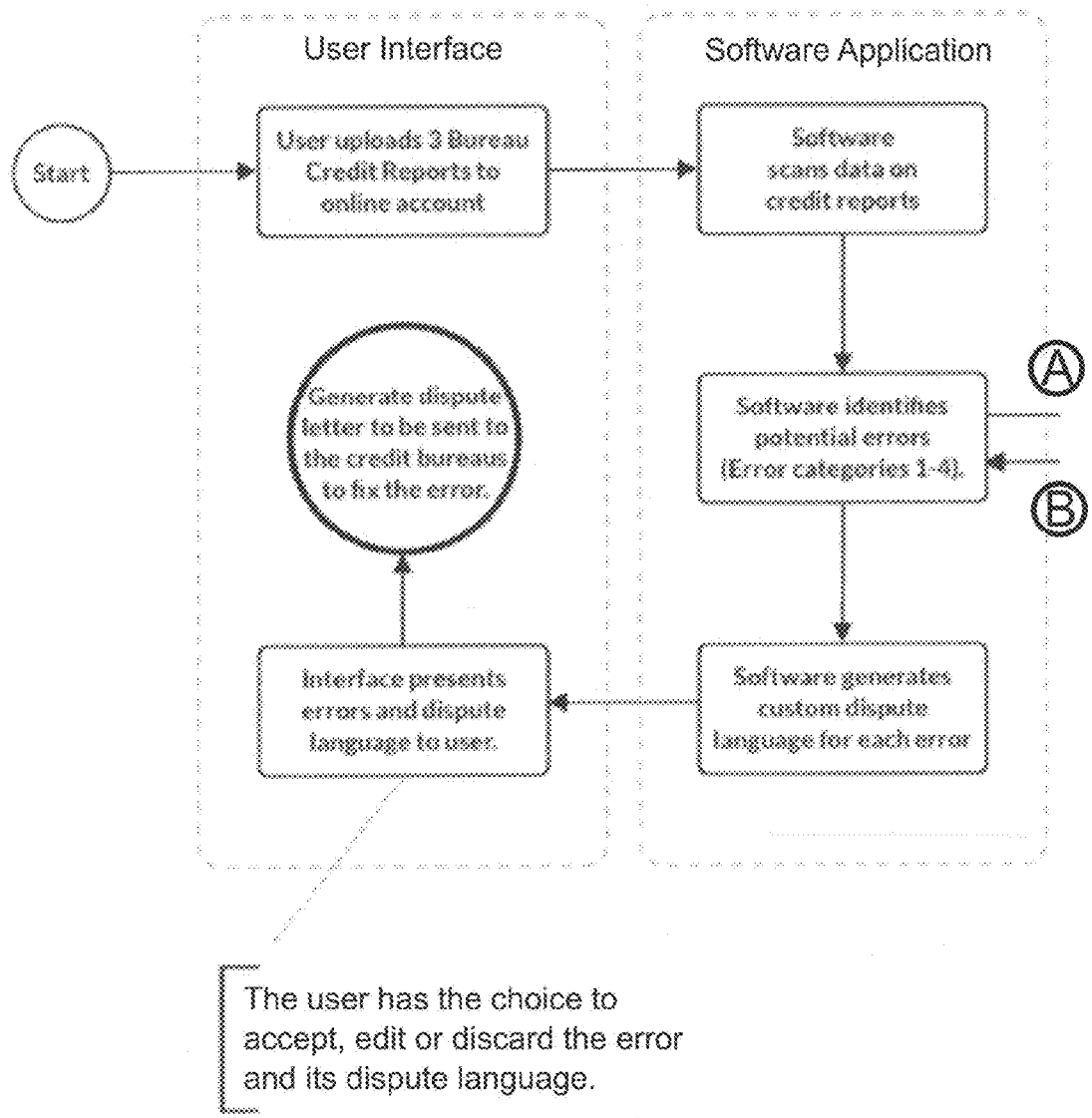
FIGS. 1A-1B is an operational flow diagram illustrating one example procedure for auditing, identifying and automatically generating dispute letters according to the disclosure.

As required, embodiments are disclosed herein; however, it is to be understood that the disclosed embodiments are merely examples and that the methods described below can be embodied in various forms. Therefore, specific structural and functional details disclosed herein are not to be interpreted as limiting, but merely as a representative basis for teaching one skilled in the art to variously employ the present subject matter in virtually any appropriately detailed structure and function. Further, the terms and phrases used herein are not intended to be limiting, but rather, to provide an understandable description of the concepts.

It can be advantageous to set forth definitions of certain words and phrases used throughout this disclosure. The terms "a" or "an", as used herein, are employed to describe elements and components described herein. This is done merely for convenience and to give a general sense of the scope of the disclosure. This description should be read to include one or at least one and the singular also includes the plural unless it is obvious that it is meant otherwise. The term plurality, as used herein, is defined as two or more than two. The term another, as used herein, is defined as at least a second or more.

The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A; B; C; A and B; A and C; B and C; and A, B, and C.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Note that not all of the activities described above in the general description or the examples are required, that a portion of a specific activity may not be required, and that one or more further activities can be performed in addition to those described. Still further, the order in which activities are listed are not necessarily the order in which they are performed.

In general, the disclosure relates to a system and method for automatically determining whether errors appear on a consumer's credit report and automatically generates a dispute letter containing custom-made dispute language that describes specific errors for the purpose of helping consumers easily create Fair Credit Reporting Act (FCRA) dispute letters to be sent to the credit bureaus. The system and method could be used, for example, by consumers, credit repair companies, attorneys, credit bureaus and anyone else that has an interest in identifying or trying to fix inaccuracies on a consumer credit file.

All data on a consumer's past and current credit reports from all three credit bureaus is scanned and any actual and/or likely errors are identified solely based on the information contained within the reports, without any additional input from the consumer. Certain potential errors can also be flagged to allow for additional input from the consumer to confirm whether there is indeed an error or not.

The system and method can include a separate unit which automatically generates custom-made dispute language that describes these specific errors for the purpose of helping consumers. A user interface allows a consumer to easily and intuitively generate a dispute letter by quickly selecting or approving accounts identified as errors, along with automatically generated dispute language describing the specific errors to be included in their dispute letters to be sent to the credit bureaus.

Figure 1B:
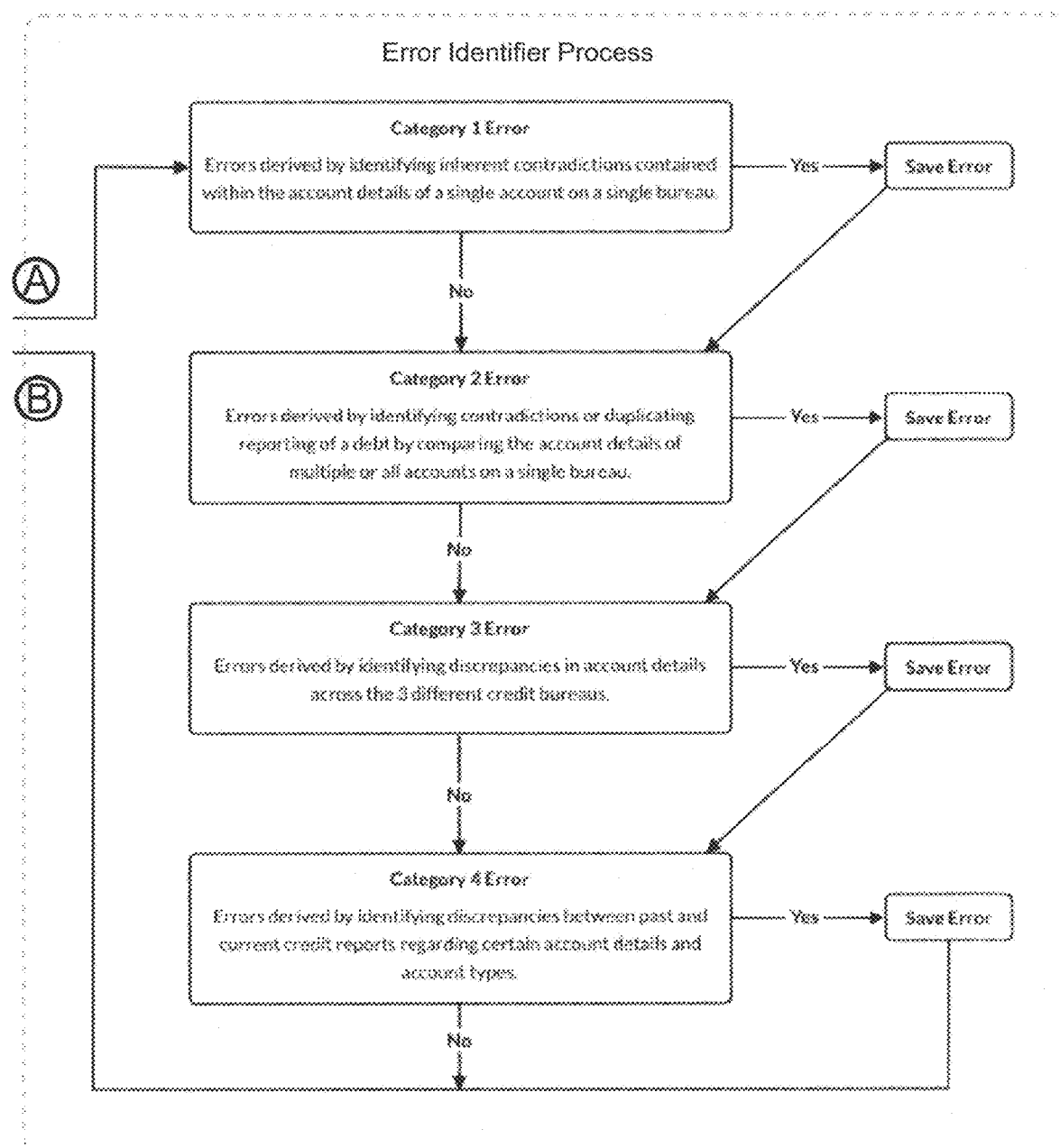

Turning now to FIGS. 1A-1B, an operational flow diagram illustrating one exemplary procedure for auditing, identifying and automatically generating dispute letters is provided. The process begins by uploading credit reports for the user from all three credit reporting agencies. The reports are scanned and analyzed for any potential errors. It should be noted that although there are currently three main active credit reporting agencies, i.e. Equifax, Experian, and TransUnion (TRU), the process may be applied to different credit reporting agencies and any number of credit reporting agencies.

Figure 2:
FIG. 2 shows an example of a Category 1 Error.

There are four different error categories. The first category of errors are errors derived by identifying inherent contradictions contained within the account details of a single account on a single bureau. For example, as shown in FIG. 2, a client's TRU report from May 1, 2020 has an account that is listed as "Closed" and "Charged off" with a past due amount of $50 and a balance of $300. As the account is listed as both "Closed" and "Charged Off", the past due amount and the balance amount should be equal.

Figure 3:
FIG. 3 shows an example of a Category 2 Error.

The second category of errors are errors derived by identifying contradictions or duplicating reporting of a debt by comparing the account details of multiple or all accounts on a single bureau. For example, as shown in FIG. 3, a client's TRU report from May 1, 2020 indicates there is an account being furnished by a credit union (i.e. Nevada Credit Union) reporting a $800 balance owed. On that same report, there is a collection account being furnished by a debt collector (i.e. Collection Agency Vegas) for that same debt and it is also reporting a balance owed. The balances for both accounts are $800 and it is evident that the balance on the collection account relates to the same debt being reported with a balance due by the original creditor (Nevada Credit Union).

The third category of errors are those errors derived by identifying discrepancies in account details across at least two different credit bureaus, and optionally, all credit bureaus from which data has been uploaded. For example, as shown in FIG. 4, a client's TRU report from May 1, 2020 has an account (i.e. Hyundai) that is being reported as "Closed" with a $0 balance but on the client's EQU report from May 1, 2020 that same account is being reported as "Open" and/or with a $437 balance. One of these entries is obviously incorrect, therefore, an error is identified.

The final category of errors is those errors derived by identifying discrepancies between past and current credit reports regarding certain account details and account types. For example and as shown in FIG. 5, on a client's TRU report from Feb. 1, 2020, there was a collection account with an open date of Oct. 1, 2015. But, on the client's TRU report from May 1, 2020, that same collection account now has an open date of Apr. 1, 2020.

When an error is identified, the process generates custom dispute language for each error and presents the errors and dispute language to the user via a user interface. The user has the option to accept, edit or discard the error and its dispute language. The disclosure contemplates that the identified errors can be presented to the user prior to generating the custom dispute language so that if the user wishes to omit a particular identified error (for example if the error has already been resolved), no custom dispute language is generated for that omitted error. If the user desires, a dispute letter is automatically generated from the custom dispute language and sent to the proper credit reporting agency so that the error may be corrected. The process provides the user with appropriate guidance on how to send the dispute letter based on the requirements from the proper credit reporting agency (e.g. certified mail, email to specific email address, online form, etc).

Figure 6:
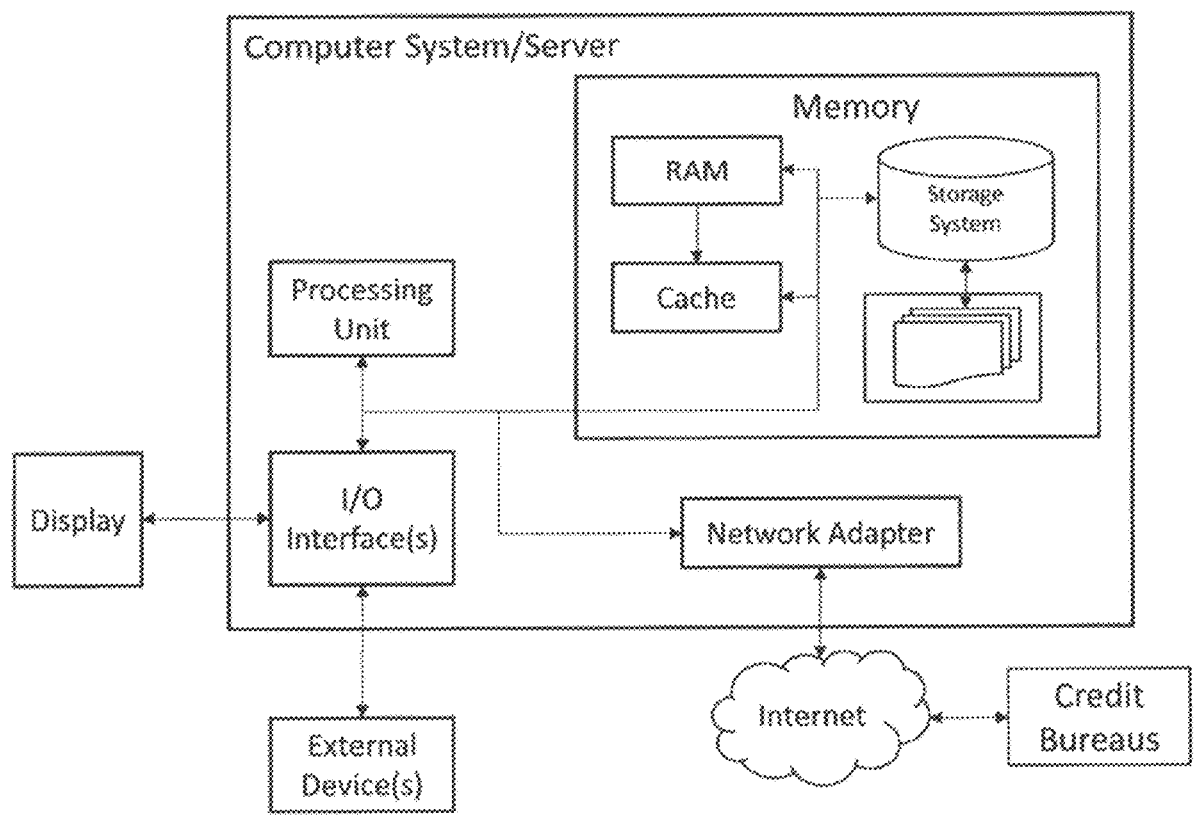
FIG. 6 is an example block diagram of the error auditing and dispute system that can be utilized in embodiments of the present disclosure.

Turning now to FIG. 6, an example block diagram of the error auditing and dispute system that can be utilized in embodiments of the present disclosure is provided. The error auditing and dispute system is based upon a suitably configured processing system configured to implement one or more embodiments of the present disclosure. Any suitably configured processing system, including mobile devices running a software application, can be used as the error auditing and dispute system in embodiments of the present disclosure. The components of the error auditing and dispute system can include, but are not limited to, one or more processors or processing units, a system memory, and a bus that couples various system components including the system memory to the processor.

The main memory may include an error identifier, a user interface, user credit reports, a dispute generator, and the various error reports. One or more of these components can reside within the processor or be a separate hardware component. The system memory can also include computer system readable media in the form of volatile memory, such as random access memory (RAM) and/or cache memory. The error auditing and dispute system can further include other removable/non-removable, volatile/non-volatile computer system storage media. By way of example only, a storage system can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. The memory can include at least one program product having a set of program modules that are configured to carry out the functions of an embodiment of the present disclosure.

Error auditing and dispute programs having a set of program modules may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the present disclosure.

The error auditing and dispute system can also communicate with one or more external devices such as a keyboard, a pointing device, a display, etc.; one or more devices that enable a user to interact with the information processing system; and/or any devices (e.g., network card, modem, etc.) that enable computer system/server to communicate with one or more other computing devices. Such communication can occur via I/O interfaces. Still yet, the information processing system can communicate with one or more networks such as a local area network (LAN), a general wide area network (WAN), and/or a public network (e.g., the Internet) via network adapter. As depicted, the network adapter communicates with the other components of information processing system via the bus. Other hardware and/or software components can also be used in conjunction with the information processing system. Examples include, but are not limited to: microcode, device drivers, redundant processing units, external disk drive arrays, RAID systems, tape drives, and data archival storage systems.

Additionally, the error auditing and dispute system may communicate with credit reporting bureaus through the Internet via the network adapter.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the disclosure, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for electronically detecting errors in a first credit report of an individual from a first credit agency and a second credit report of the individual from a second credit agency, the method comprising:
    electronically receiving, using a computer system with a hardware computer processor, credit reports produced by the first and second credit agency;
    using the hardware computer processor to:
        identify a first category of errors in the first credit report by finding contradictions contained within each account in the first credit report;
        identify a first category of errors in the second credit report by finding contradictions contained within each account in the second credit report;
        identify a second category of errors in the first credit report by finding contradictions or duplications by comparing at least two accounts in the first credit report;
        identify a second category of errors in the second credit report by finding contradictions or duplications by comparing at least two accounts in the second credit report;
        identify a third category of errors by finding discrepancies in at least one account found in both the first and second credit reports;
        electronically store previous versions of the first credit report and the second credit report, the previous versions electronically readable by the hardware computer processor;
        identify a fourth category of errors in the first credit report by finding discrepancies between the first credit report and at least one previous credit report for the individual from the first agency; and
        identify a fourth category of errors in the second credit report by finding discrepancies between the second credit report and at least one previous credit report for the individual from the second agency;
    wherein each of the identifying steps is performable by the processor without human intervention;
    in response to identifying at least one category of errors, present the errors to a human user together with an electronic display interface for selecting errors to include or omit; and
    generating a report of the included errors in a reporting format accepted by at least one of the first and second credit agency.

2. The method of claim 1, wherein electronically storing previous versions of the first credit report and the second credit report include uploading the first and second credit reports to an online account associated with the individual.

3. The method of claim 1, wherein the generated report is electronically transmittable to the at least one of the first and second credit agency.

4. The method of claim 3, further including using the computer processor to electronically transmit reports to at least one of the first and second credit agency.

5. A method for automatic audit, detection, and dispute generation for errors in credit reports and/or credit scores, comprising:

electronically storing data pertaining to a consumer's past and current credit reports from a plurality of credit bureaus;

accessing the stored data over a computer network using one or more computer processors executing instructions stored on non-transitory media;

processing the stored data using the one or more computer processors to identify errors (a) within a given report affecting a single account, (b) within a given report affecting multiple accounts, (c) between current reports from different credit bureaus, and (d) between current and past reports from a given credit bureau, and (e) between current and past reports from different credit bureaus;

presenting a user interface controllable by the one or more processor, the interface including the identified errors, each selectable by a user of the interface to be included or not included in a report disputing the errors; and electronically preparing the report using the one or more processors, the report including the selected errors, a report prepared for each credit bureau having one or more of the errors in the report, in a format acceptable by the credit bureau.

6. The method of claim 5, wherein the at least one processor can identify errors corresponding to, at least:
(a) a plurality of accounts on a given report duplicating the same debt with the same status, (b) a plurality of accounts on a given report reporting the same debt with a different status, and (c) reports from different credit bureaus reporting the same debt with differing status;
wherein status can include: (i) the debt being open, (ii) the debt being closed, and (iii) the date a status of the debt changed.

7. The method of claim 5, wherein electronically preparing the report includes the at least one processor selecting textual language to include in the report corresponding to each of the particular errors identified.

8. The method of claim 5, wherein the at least one processor electronically communicates the electronically prepared report to one or more credit bureaus.

9. The method of claim 5, wherein the electronically stored data is stored in an electronic account associated with the consumer.

10. The method of claim 5, wherein the computer processor enables at least one of electronic transmission of the report and printing of the report for sending to each of the bureaus.

11. A computer system for automatic audit, detection, and dispute generation for errors in credit reports and/or credit scores, comprising:
one or more computer processors executing instructions stored on non-transitory media, the instructions operative to:
electronically store data pertaining to a consumer's past and current credit reports from a plurality of credit bureaus;
access the stored data over a computer network;
process the stored data to identify errors (a) within a given report affecting a single account, (b) within a given report affecting multiple accounts, (c) between current reports from different credit bureaus, and (d) between current and past reports from a given credit bureau, and (e) between current and past reports from different credit bureaus;
present a user interface controllable by the one or more processor, the interface including the identified errors, each selectable by a user of the interface to be included or not included in a report disputing the errors; and
electronically prepare the report using the one or more processors, the report including the selected errors, a report prepared for each credit bureau having one or more of the errors in the report, in a format acceptable by the credit bureau.

12. The system of claim 11, the instructions further operative to electronically transmit the report.

13. The system of claim 12, the instructions further operative to electronically transmit reports to at least one of the credit bureaus.

* * * * *